(12) United States Patent
Zumsteg et al.

(10) Patent No.: US 8,881,982 B2
(45) Date of Patent: Nov. 11, 2014

(54) PORTABLE ENCODED INFORMATION READING TERMINAL CONFIGURED TO ACQUIRE IMAGES

(75) Inventors: Philip Zumsteg, Shorewood, MN (US); Tom Plocher, Hugo, MN (US); Sriharsha Putrevu, Maple Grove, MN (US)

(73) Assignee: Honeywell Scanning & Mobility, Fort Mill, SC (US)

( * ) Notice: Subject to any disclaimer, the term of this patent is extended or adjusted under 35 U.S.C. 154(b) by 126 days.

(21) Appl. No.: 13/451,744

(22) Filed: Apr. 20, 2012

(65) Prior Publication Data

US 2013/0277427 A1  Oct. 24, 2013

(51) Int. Cl.
G06K 7/00 (2006.01)
G06K 7/10 (2006.01)
G06K 7/06 (2006.01)

(52) U.S. Cl.
USPC ............ 235/440; 235/435; 235/441; 235/454

(58) Field of Classification Search
USPC ........ 235/435, 440, 451, 454, 462.01–462.49
See application file for complete search history.

(56) References Cited

U.S. PATENT DOCUMENTS

| | | | |
|---|---|---|---|
| 6,659,344 B2 | 12/2003 | Otto et al. | |
| 7,003,138 B2 | 2/2006 | Wilson | |
| 7,015,967 B1 | 3/2006 | Kochi et al. | |
| 7,237,721 B2 | 7/2007 | Bilcu et al. | |
| 7,308,158 B2 | 12/2007 | Herbert et al. | |
| 7,405,662 B2 | 7/2008 | Steinke et al. | |
| 7,407,096 B2 | 8/2008 | McQueen et al. | |
| 7,494,063 B2 | 2/2009 | Kotlarsky et al. | |
| 7,501,950 B2 | 3/2009 | Suzuki | |
| 7,535,361 B2 | 5/2009 | Doan et al. | |
| 7,551,090 B2 | 6/2009 | Doan et al. | |
| 7,602,288 B2 | 10/2009 | Broussard | |
| 7,627,191 B2 | 12/2009 | Xu et al. | |
| 7,677,602 B2 | 3/2010 | Bennett et al. | |
| 7,696,874 B2 | 4/2010 | Stevens | |
| 7,702,187 B2 | 4/2010 | Rusman et al. | |

(Continued)

OTHER PUBLICATIONS

EPC Global, Specification for RFID Air Interface, EPC Radio-Frequency Identity Protocols Class-1 Generation-2 UHF RFID Protocol for Communications at 860 MHz-960 MHz, Version 1.0.9, Jan. 31, 2005, pp. 1-94.

(Continued)

*Primary Examiner* — Michael G Lee
*Assistant Examiner* — Laura Gudorf
(74) *Attorney, Agent, or Firm* — Oliff PLC; R. Brian Drozd

(57) ABSTRACT

An encoded information reading (EIR) terminal can comprise a microprocessor, a memory, an EIR device including a two-dimensional imaging device, a motion sensing device, and a communication interface. The EIR terminal can be configured, responsive to detecting a pre-defined pattern in a first plurality of values received from the motion sensing device, to store in the memory a point of origin equal to a first spatial position of the EIR terminal. The EIR terminal can be further configured, responsive to detecting a user interface command, to determine, based on a second plurality of values received from the motion sensing device, a second spatial position of the EIR terminal relative to the point of origin, and to acquire an image of the object. The EIR terminal can be further configured to determine the image scale factor based on at least the second spatial position.

19 Claims, 9 Drawing Sheets

(56) References Cited

U.S. PATENT DOCUMENTS

| | | | |
|---|---|---|---|
| 7,708,205 | B2 | 5/2010 | Kotlarsky et al. |
| 7,735,731 | B2 | 6/2010 | Skaaksrud et al. |
| 7,756,292 | B2 | 7/2010 | Lev |
| 7,756,319 | B2 | 7/2010 | Odell |
| 7,786,865 | B2 | 8/2010 | Park |
| 7,786,925 | B1 | 8/2010 | Knibbe et al. |
| 7,815,121 | B2 | 10/2010 | Kotlarsky et al. |
| 7,821,400 | B2 | 10/2010 | Tabet et al. |
| 7,831,082 | B2 | 11/2010 | Holsing et al. |
| 7,855,643 | B2 | 12/2010 | Tuttle |
| 7,870,999 | B2 | 1/2011 | Skaaksrud et al. |
| 7,883,013 | B2 | 2/2011 | Skaaksrud et al. |
| 7,886,972 | B2 | 2/2011 | Skaaksrud et al. |
| 7,951,003 | B2 | 5/2011 | Russell et al. |
| 7,961,908 | B2 | 6/2011 | Tzur et al. |
| 7,965,186 | B2 | 6/2011 | Downie et al. |
| 8,115,601 | B2 | 2/2012 | Nonaka |
| 8,149,094 | B2 | 4/2012 | Deoalikar et al. |
| 2002/0165758 | A1 | 11/2002 | Hind et al. |
| 2005/0212817 | A1 | 9/2005 | Cannon et al. |
| 2006/0131418 | A1* | 6/2006 | Testa ............... 235/472.01 |
| 2006/0262961 | A1 | 11/2006 | Holsing et al. |
| 2006/0266836 | A1 | 11/2006 | Bilcu et al. |
| 2007/0008136 | A1 | 1/2007 | Suzuki |
| 2007/0102506 | A1 | 5/2007 | Stevens |
| 2007/0199995 | A1 | 8/2007 | Kotlarsky et al. |
| 2007/0215706 | A1 | 9/2007 | Kotlarsky et al. |
| 2008/0037899 | A1 | 2/2008 | Xu et al. |
| 2008/0061937 | A1 | 3/2008 | Park |
| 2008/0111661 | A1 | 5/2008 | Lin et al. |
| 2008/0122785 | A1* | 5/2008 | Harmon ............... 345/156 |
| 2008/0164313 | A1 | 7/2008 | Kotlarsky et al. |
| 2008/0164317 | A1 | 7/2008 | Kotlarsky et al. |
| 2008/0169343 | A1 | 7/2008 | Skaaksrud et al. |
| 2008/0172303 | A1 | 7/2008 | Skaaksrud et al. |
| 2008/0173706 | A1 | 7/2008 | Skaaksrud et al. |
| 2008/0173710 | A1 | 7/2008 | Skaaksrud et al. |
| 2008/0203147 | A1 | 8/2008 | Skaaksrud et al. |
| 2008/0203166 | A1 | 8/2008 | Skaaksrud et al. |
| 2008/0210749 | A1 | 9/2008 | Skaaksrud et al. |
| 2008/0210750 | A1 | 9/2008 | Skaaksrud et al. |
| 2008/0224870 | A1 | 9/2008 | Yeo et al. |
| 2008/0285091 | A1 | 11/2008 | Skaaksrud et al. |
| 2009/0021353 | A1 | 1/2009 | Nanaka |
| 2009/0040025 | A1 | 2/2009 | Volpi et al. |
| 2009/0045913 | A1 | 2/2009 | Nelson et al. |
| 2009/0045924 | A1 | 2/2009 | Roberts, Sr. et al. |
| 2009/0121025 | A1 | 5/2009 | Romanchik |
| 2009/0161964 | A1 | 6/2009 | Tzur et al. |
| 2009/0243801 | A1 | 10/2009 | Strzelczyk |
| 2009/0245755 | A1 | 10/2009 | Lee et al. |
| 2009/0322537 | A1 | 12/2009 | Tapp et al. |
| 2010/0045436 | A1 | 2/2010 | Rinkes |
| 2010/0073487 | A1 | 3/2010 | Sogoh et al. |
| 2010/0109844 | A1 | 5/2010 | Carrick et al. |
| 2010/0109903 | A1 | 5/2010 | Carrick |
| 2010/0142825 | A1 | 6/2010 | Maxwell et al. |
| 2010/0148985 | A1 | 6/2010 | Lin et al. |
| 2010/0201488 | A1 | 8/2010 | Stern et al. |
| 2010/0201520 | A1 | 8/2010 | Stern et al. |
| 2010/0220894 | A1 | 9/2010 | Ackley et al. |
| 2010/0226530 | A1 | 9/2010 | Lev |
| 2010/0232712 | A1 | 9/2010 | Tomita et al. |
| 2010/0252621 | A1 | 10/2010 | Ito et al. |
| 2010/0271187 | A1 | 10/2010 | Uysal et al. |
| 2010/0296753 | A1 | 11/2010 | Ito et al. |
| 2010/0303348 | A1 | 12/2010 | Tolliver et al. |
| 2010/0308964 | A1 | 12/2010 | Ackley et al. |
| 2011/0052008 | A1 | 3/2011 | Holsing et al. |
| 2011/0084808 | A1 | 4/2011 | Tuttle |
| 2011/0115947 | A1 | 5/2011 | Oh |
| 2011/0128125 | A1 | 6/2011 | Kai et al. |
| 2011/0143811 | A1 | 6/2011 | Rodriguez |
| 2011/0205387 | A1 | 8/2011 | Tzur et al. |
| 2011/0212717 | A1 | 9/2011 | Rhoads et al. |
| 2011/0280447 | A1 | 11/2011 | Conwell |
| 2011/0284625 | A1 | 11/2011 | Smith et al. |
| 2011/0290883 | A1 | 12/2011 | Kotlarsky et al. |
| 2012/0205440 | A1* | 8/2012 | Fujiwara ............... 235/375 |
| 2013/0049962 | A1* | 2/2013 | Smith et al. ............ 340/572.1 |

OTHER PUBLICATIONS

U.S. Appl. No. 13/359,005 entitled "Portable RFID Reading Terminal With Visual Indication of Scan Trace" filed Jan. 26, 2012, pp. 1-27.

U.S. Appl. No. 13/452,133 entitled "System and Method for Calibration and Mapping of Real-Time Location Data" filed Apr. 20, 2012, pp. 1-43.

U.S. Appl. No. 13/451,761 entitled "Portable Encoded Information Reading Terminal Configured to Locate Groups of RFID Tags" filed Apr. 20, 2012, pp. 1-21.

U.S. Appl. No. 13/451,959 entitled "Portable Encoded Information Reading Terminal Configured to Adjust Transmit Power Level" filed Apr. 20, 2012, pp. 1-38.

U.S. Appl. No. 13/474,014 entitled "Cloud-Based System for Reading of Decodable Indicia" filed May 17, 2012, pp. 1-28.

U.S. Appl. No. 13/545,454 entitled "Cloud-Based System for Processing of Decodable Indicia" filed Jul. 10, 2012, pp. 1-24.

* cited by examiner

ABSOLUTE ORIGIN COORDINATES

RELATIVE ORIGIN COORDINATES

2D IMAGER ROTATED WITH RESPECT TO PHYSICAL OBJECT FRAME OF REFERENCE

US 8,881,982 B2

PORTABLE ENCODED INFORMATION READING TERMINAL CONFIGURED TO ACQUIRE IMAGES

FIELD OF THE INVENTION

The invention is generally related to encoded information reading (EIR) terminals and is specifically related to EIR terminals comprising an imaging device.

BACKGROUND OF THE INVENTION

RFID methods are widely used in a number of applications, including smart cards, item tracking in manufacturing, inventory management in retail, etc. An RFID tag can be attached, e.g., to an inventory item. An RFID reading terminal can be configured to read the memory of an RFID tag attached to an inventory item.

SUMMARY OF THE INVENTION

In one embodiment, there is provided an encoded information reading (EIR) terminal comprising a microprocessor, a memory, an EIR device including a two-dimensional imaging device, a motion sensing device, and a communication interface. The EIR device can be configured to output raw image data containing an encoded message and/or to output decoded message data corresponding to an encoded message. The EIR terminal can be configured, responsive to detecting a pre-defined pattern in a first plurality of values received from the motion sensing device, to store in the memory a point of origin equal to a first spatial position and orientation of the EIR terminal. The EIR terminal can be further configured, responsive to detecting a user interface command, to determine, based on a second plurality of values received from the motion sensing device, a second spatial position and orientation of the EIR terminal relative to the point of origin, and to acquire an image of an object in a field of view of the imaging device. The EIR terminal can be further configured to determine the image scale factor based on at least the second spatial position. The image scale factor can be provided by a ratio of the size of the object along a chosen direction to the size of the image of the object in the same direction.

In a further aspect, the motion sensing device can be provided by at least three accelerometers configured to measure proper acceleration values of the EIR terminal along at least three mutually-perpendicular axes. In one embodiment, the motion sensing device can be provided by a 9-DOF (degree of freedom) motion sensing unit containing a 3-axis accelerometer, a 3-axis magnetometer, and 3-axis gyroscope sensors.

In a further aspect, the EIR terminal can be further configured to determine a change of a spatial position and orientation of the EIR terminal based on proper acceleration values received from at least the accelerometers.

In a further aspect, the EIR terminal can be further configured to process the acquired image before determining the image scale factor, with the purpose of removing various image distortions including but not limited to keystone-related distortion and/or rotation-related distortions.

In a further aspect, the EIR terminal can be further configured to process the acquired image to detect a plurality of edges of the object and to determine one or more dimensions of the object.

In a further aspect, the EIR terminal can be further configured to transmit the acquired image to an external computer via the communication interface. In one embodiment, the EIR terminal can be further configured to also transmit the imaged object identifier, the object description, and/or one or more dimensions of the object to the external computer.

In a further aspect, the EIR terminal can be further configured to identify the imaged object, e.g., by scanning a bar code attached to the object, or by reading an RFID tag attached to the object.

In a further aspect, the EIR terminal can comprise a second EIR device provided by a bar code reading device, an RFID reading device, or a magnetic card reading device. The EIR device can be configured to output raw message data containing an encoded message and/or to output decoded message data corresponding to an encoded message In another embodiment, there is provided a method of producing an image of an object by an EIR terminal comprising a microprocessor, a memory, a two-dimensional imaging device, and a motion sensing device. The method can comprise the step of storing in the memory of the EIR terminal a first spatial position of the EIR terminal as a point of origin, responsive to detecting a pre-defined pattern in a first plurality of values received from the motion sensing device. The method can further comprise the step of determining, based on a second plurality of values received from the motion sensing device, a second position of the EIR terminal relative to the point of origin, responsive to detecting a user interface command. The method can further comprise the step of acquiring an image of an object in the field of view of the imaging device. The method can further comprise the step of determining the image scale factor based on at least the second spatial position.

In a further aspect, the motion sensing device can be provided by at least three accelerometers configured to measure proper acceleration values of the EIR terminal along at least three mutually-perpendicular axes. In one embodiment, the motion sensing device can be provided by a 9-DOF (degree of freedom) motion sensing unit containing a 3-axis accelerometer, a 3-axis magnetometer, and 3-axis gyroscope sensors.

In a further aspect, the method can further comprise the step of processing the image before determining the image scale factor, with the purpose of removing various image distortions including but not limited to keystone-related distortion and/or rotation-related distortions.

In a further aspect, the method can further comprise the steps of the processing the image to detect a plurality of edges of the object; and the EIR terminal determining one or more dimensions of the object.

In a further aspect, the method can further comprise the step of the transmitting the image to an external computer. In one embodiment, the method can further comprise the step of transmitting the imaged object identifier, the object description, and/or one or more dimensions of the object to the external computer.

In a further aspect, the method can further comprise the step of identifying the imaged object, e.g., by scanning a bar code attached to the object and/or by reading an RFID tag attached to the object.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale, emphasis instead generally being placed upon illustrating the principles of the invention. In the drawings, like numerals are used to indicate like parts throughout the various views.

DETAILED DESCRIPTION OF THE INVENTION

In one embodiment, there is provided an EIR terminal comprising a microprocessor, a memory, an EIR device including an imaging device, and a motion sensing device. Using the motion sensing data, the EIR terminal can be configured to determine its spatial position relatively to the object being imaged by the imaging device, or at least the distance to the surface of the object being imaged, as described in details herein infra. Based on the known distance to the imaged physical object, the EIR terminal can be further configured to calculate the scale factor of the image.

The above described functionality can be particularly useful for a portable RFID reading terminal configured to display a scan trace overlaid over an image of a physical structure containing inventory items, thus providing the terminal's operator with a visual feedback with respect to the scanning progress, as described in the commonly assigned U.S. patent application Ser. No. 13/359,005 entitled "Portable RFID Reading Terminal with Visual Indication of Scan Trace" filed on Jan. 26, 2012, which is incorporated herein by reference in its entirety.

At any moment in time, the RF signal coverage emitted by an RFID reading terminal can be defined by a 3D shape. The form and size of the 3D shape defining the RF signal coverage depend, among other factors, on the RFID transmit power level and the number and configuration of the RF antennas employed by the RFID reading device. Hence, a target scan area by an RFID reading terminal can be visualized as a projection of the 3D RF signal coverage shape onto an arbitrarily chosen plane. For a moving RFID reading terminal, a visual scan trace can be provided by a line defined by a multitude of time varying points, each point being a projection of the 3D RF signal coverage shape onto the arbitrarily chosen plane at a given moment in time. The imaginary plane onto which the visual scan trace is projected can be chosen to intersect a physical structure (e.g., a shelving unit) containing a plurality of items to be inventoried, and thus the scan trace can be overlaid over an image of the physical structure.

The images of the physical structures (e.g., shelving units disposed in retail or storage facilities) having known spatial positions and known dimensions can be acquired by the EIR terminal disclosed herein, and can be transmitted to a database and/or to the portable RFID reading terminal employed to read RFID tags attached to items stored in a manufacturing, retail, and/or storage facility.

In one embodiment, the EIR terminal disclosed herein can be equipped with an RFID reading device. The EIR terminal can be configured to acquire an image of a physical structure, determine the scale factor of the image, as described in details herein infra, and then display an RFID scan trace, as described in the above mentioned U.S. patent application Ser. No. 13/359,005

Figure 1A:
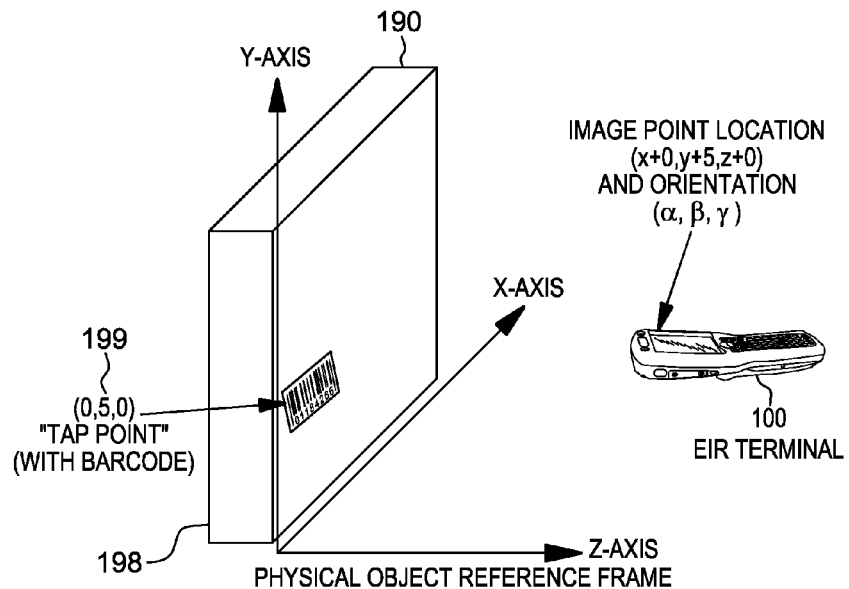
FIGS. 1a-1b schematically illustrate a process of acquiring an image by the EIR terminal disclosed herein.
Figure 1B:
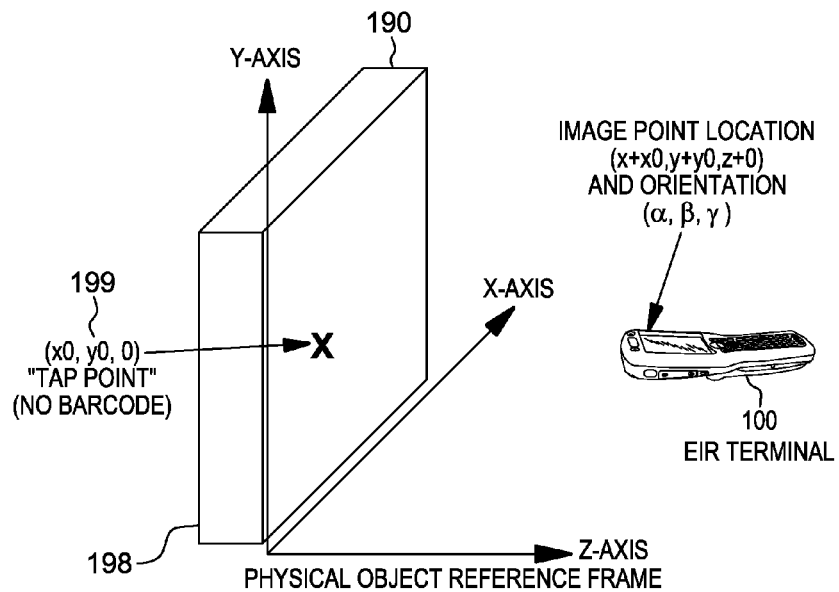

The operator of the EIR terminal can be instructed, before activating the shutter release control for acquiring an image, to bring EIR terminal 100 into a mechanical contact with a surface of a physical object 190 to be imaged, as schematically shown in FIG. 1a. In one embodiment, the area 199 on the surface of the physical object to be tapped by the EIR terminal can be marked with a distinctive visual pattern. Alternatively, the operator can bring EIR terminal 100 into a mechanical contact with any point on the surface of physical object 190, as schematically shown in FIG. 1b.

In a further aspect, the motion sensing device can be provided by at least three accelerometers configured to measure the proper acceleration values of the EIR terminal along three mutually perpendicular axes. Bringing the EIR terminal into a mechanical contact with a stationary object would result in a distinctive spike in the data returned by the motion sensing device, caused by the mechanical velocities and proper accelerations of the EIR terminal along the three axes becoming zeroes almost immediately, and remaining at zero levels while the operator holds the terminal in a mechanical contact with the physical structure.

Responsive to detecting the above described pattern in the data returned by the motion sensing device, the EIR terminal can be configured to set a point of origin at its current spatial position, and to start tracking, by the motion sensing device, any future movements of the EIR terminal relatively to this point of origin. As follows from the above explanations, the point of origin should coincide with either a pre-defined point or an arbitrary chosen point on the surface of the object of interest.

Responsive to detecting a user interface command (e.g., a shutter release button or touch screen GUI control), the EIR terminal can determine its current position relative to the previously defined point of origin, and release the shutter of the imaging device, thus acquiring an image of the object in the field of view of the imaging lens of the imaging device.

In one embodiment, the operator of EIR terminal 100 can bring EIR terminal 100 into a physical contact with a pre-defined point 199 (hereinafter referred to as the "pre-defined tap point") on the surface of the physical object 190, as schematically shown in FIG. 1a, and hence the EIR terminal can be configured to determine its current position in a reference frame XYZ connected to the pre-defined point on the surface of the physical object. The origin of the reference frame can coincide with the pre-defined tap point 199 on the surface of the physical object 190. Alternatively, the origin of the reference frame can coincide with a second pre-defined point 198 (e.g., the left bottom corner of the front surface of the physical object) located at a known displacement from the pre-defined tap point.

In another embodiment, the operator of EIR terminal 100 can bring EIR terminal 100 into a physical contact with an arbitrarily chosen point 197 (hereinafter referred to as an "arbitrarily chosen tap point") on the surface of the physical object 190, as schematically shown in FIG. 1b, and hence the EIR terminal can be configured to determine its current position in a reference frame XYZ connected to the arbitrarily chosen point on the surface of the physical object. Since the origin of the reference frame would coincide with an arbitrarily chosen tap point on the front surface of the object 190, EIR terminal 100 can be configured to determine the Z coordinate, i.e. the distance between EIR terminal 100 and the front surface of the object 190. Alternatively, the origin of the reference frame can coincide with a second pre-defined point 198 (e.g., the left bottom corner of the front surface of the physical object) located at a known displacement along the Z-axis from the pre-defined tap point.

Thus, in any of the above described two illustrative embodiments, EIR terminal 100 can be configured to determine the distance along the Z-axis between itself and the imaged physical object, based on the known position of the EIR terminal relative to the pre-defined point of origin at the time of releasing the shutter. The acquired image, the distance between the EIR terminal and the imaged object, and/or the position of the EIR terminal relative to the pre-defined point of origin (including orientation of the EIR terminal, i.e., the direction in which the EIR terminal was pointing at the time when the shutter release control was activated) can then be stored in the memory of the EIR terminal.

In a further aspect, an identifier of the imaged physical object can also be stored in the memory of the EIR terminal. In one embodiment, the imaged object can be identified by scanning a bar code label attached to the object and decoding the bar code to retrieve the object identifier. In a further aspect, the bar code label can be attached to the surface of the object in a visual reference with the pre-defined tap point.

In a further aspect, the message encoded in the bar code can further include the object description, such as the position of the object on the facility floor plan and/or characteristics of the object comprising, for example, physical dimensions of the object, the number, sizes, and locations of shelves. In a further aspect, the message encoded in the bar code can further include the coordinates of the pre-defined tap point in the reference frame.

In another embodiment, the imaged physical object can be identified by reading an RFID tag attached to the object. In one embodiment, the RFID tag identifying the physical object can be attached to the surface of the physical object 190 at or in the vicinity the pre-defined tap point 199. Alternatively, the RFID tag identifying the physical object can be mounted elsewhere on the surface or within the physical object. To distinguish the object identifier RFID tag from other RFID tags which can be present within the RFID reading range of the physical object, the object identifier tag can include a pre-defined data pattern, e.g., as a part of the tag identifier (TID). The pre-defined data pattern can serve as an indicator that the RFID tag's memory contains the physical object identifier, object description, and/or the coordinates of the pre-defined tap point in the reference frame. Should more than one RFID tag be read (as would be the case if the shelving unit contained inventory items with RFID tags attached to them), the EIR terminal can select and further interrogate the tag having the TID containing the pre-defined data pattern. In a further aspect, the message encoded in the RFID tag memory can further include the object description, such as the position of the object on the facility floor plan and/or the description of the object comprising, for example, physical dimensions, the number, sizes, and locations of shelves.

In a yet another embodiment, the object identifier, object description, and/or the coordinates of the pre-defined tap point in the origin frame can be entered into the EIR terminal via the user interface.

Figure 2:
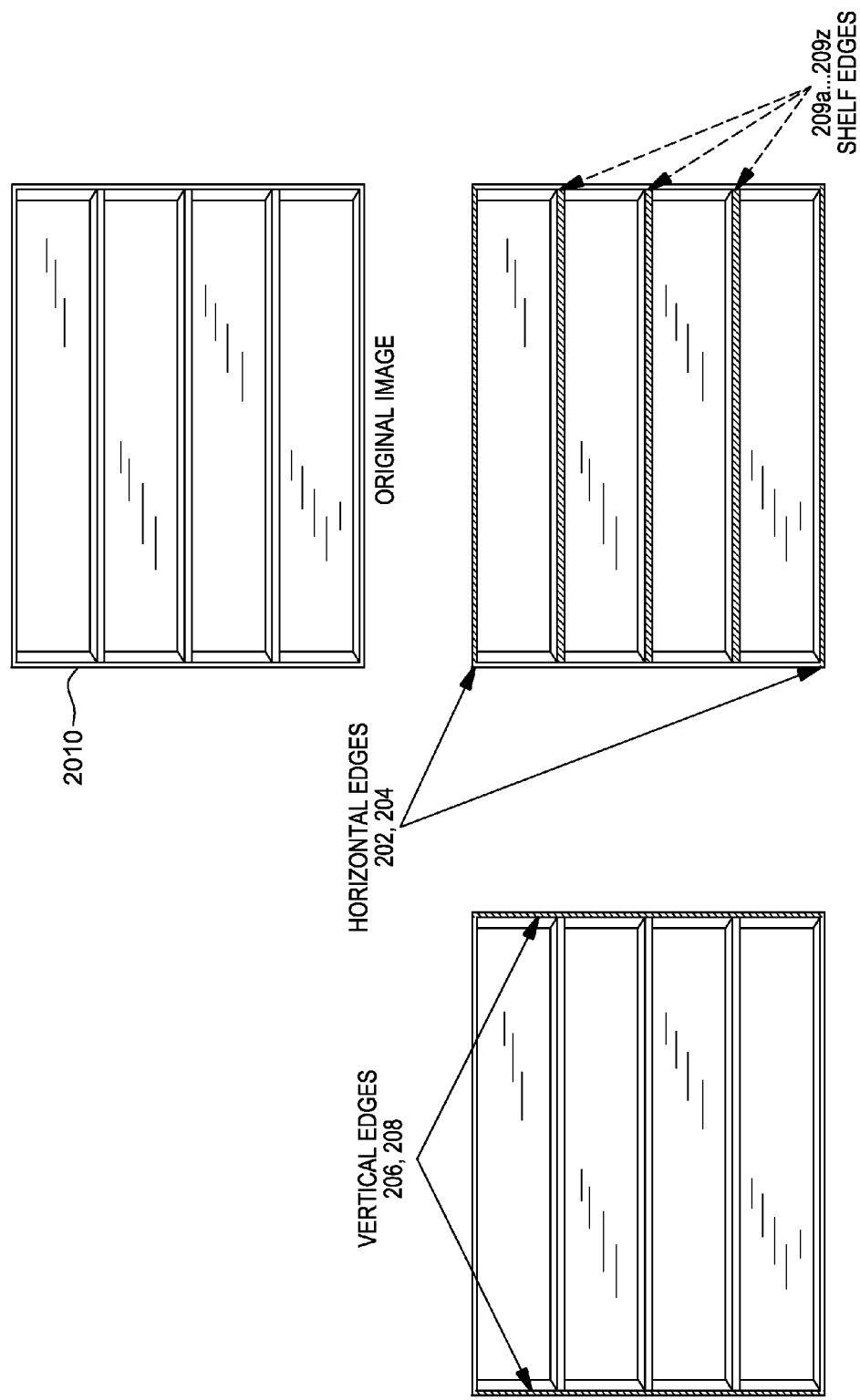
FIG. 2 schematically illustrate detecting a plurality of edges corresponding to the boundaries and structural elements of the imaged object.

In a further aspect, the acquired imaged can be assumed to include the entire physical object (e.g., a physical structure sustaining a plurality inventory items, such as a shelving unit). The EIR terminal can be configured to process the acquired image to detect the edges corresponding to the boundaries of the imaged object 2010, as schematically shown in FIG. 2. An "edge" in this context shall refer to a line along which one or more image characteristics (such as hue, saturation, color value, and brightness), both individually or in combinations, change sharply, e.g., by at least a pre-defined number of units of measuring the respective image characteristic. For example, an edge can be defined as a line along which the image brightness changes by at least a pre-defined number of brightness units. In another example, an edge can be defined as a line along which the image color changes by at least a pre-defined number of color value units. By applying an edge detecting algorithm to an image, boundaries of objects and/or boundaries of parts of objects can be discovered.

In the illustrative embodiment of FIG. 2, the top 202, bottom 204, left 206 and right 208 boundaries of the front surface of the imaged physical structure can be detected. In another illustrative embodiment, the EIR terminal can be further configured to process the acquired image to detect the edges corresponding to the structural elements of the imaged object, e.g., to the shelves 209a-209z of the shelving unit.

In one embodiment, the EIR terminal can be configured to detect edges by computing a plurality of derivatives of image pixels brightness, followed by searching for local maxima of the first order derivatives of image pixel brightness (e.g., by searching for zero crossings by the second-level derivatives). Image pixels corresponding to the local maxima of the first order derivatives of pixel brightness can be presumed to indicate the edges within the image. A skilled artisan would appreciate the fact that other methods of edge detection is within the scope of this disclosure.

Figure 3:
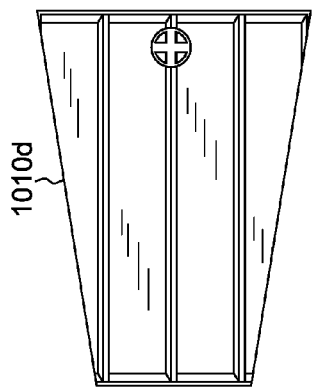
FIG. 3 schematically illustrates keystone-related image distortions.
Figure 3:
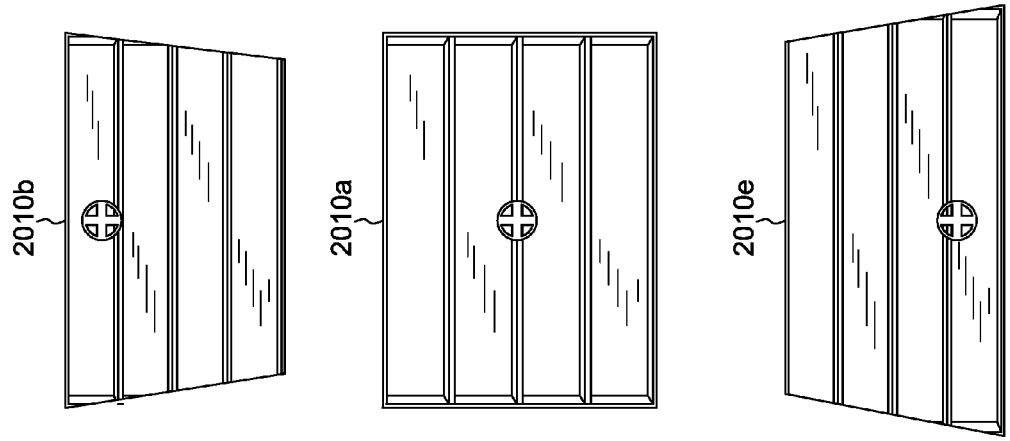
Figure 3:
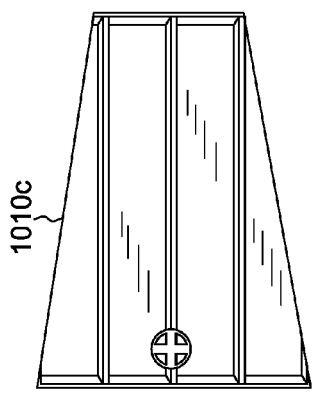

In a further aspect, the EIR terminal can be configured to process the acquired image to correct any keystone-, and/or rotation-related image distortions. Keystone-related distortions, often nicknamed "keystone effect" can be caused by the optical axis of the imaging device not being substantially perpendicular to the center of the surface of the imaged object, resulting in the image of a rectangle on the surface of the imaged object becoming a trapezoid (which is the shape of an architectural keystone, which explains the name of the effect). FIG. 3 illustrates several images of a shelving unit 2010, where the image 2010a is free of keystone effect, and images 2010b, 2010c, 2010d, and 2010e contain visible keystone distortions.

Rotation-related image distortions are deviations of horizontal (and/or vertical) lines within the imaged object from the respective horizontal and vertical axes in the image frame.

Figure 4:
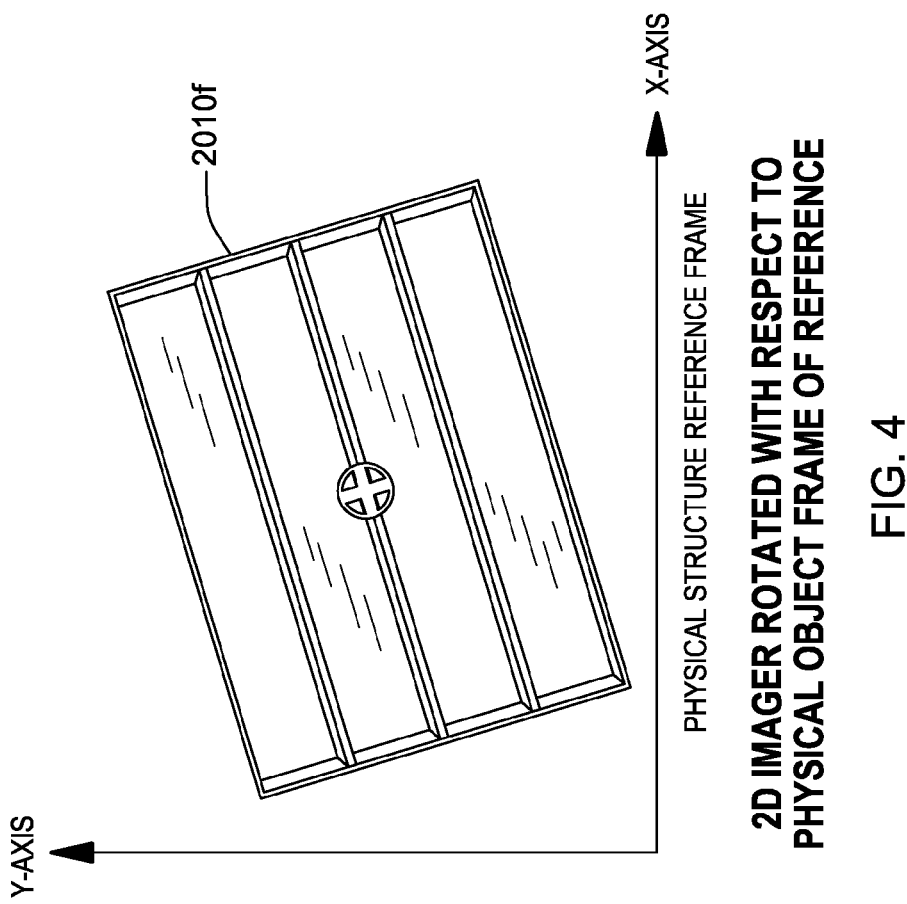
FIG. 4 schematically illustrates rotation-related image distortion.

In some situations, the imager during the exposure period can be rotated with respect to the frame of reference of the physical object 2010f, as schematically illustrated by FIG. 4.

In a further aspect, the EIR terminal can be configured to determine an image scale factor as a function of the distance between the EIR terminal and the imaged object, measured in the direction orthogonal to the front surface of the imaged object (i.e., the direction of Z axis as depicted in FIG. 1a-1b):

$$S=f(z),$$

wherein S is the image scale factor; and z is the distance between the EIR terminal and the surface of the imaged object, measured in the direction orthogonal to the front surface of the imaged object.

The image scale factor can be defined as the ratio of the physical size of the object (in the units of length, e.g., feet and inches) in a chosen direction to the size of the image of the object (in pixels) in the same direction.

In one embodiment, the EIR terminal can be configured to calculate the scale factor of the acquired image using the function $f(d)$ defined by calibration of the camera lens with reference images of specific dimensions at selected values of distance d. In another embodiment, the EIR terminal can be configured to calculate the scale factor of the acquired image using the lens maker equation and image sensor specification.

Figure 5:
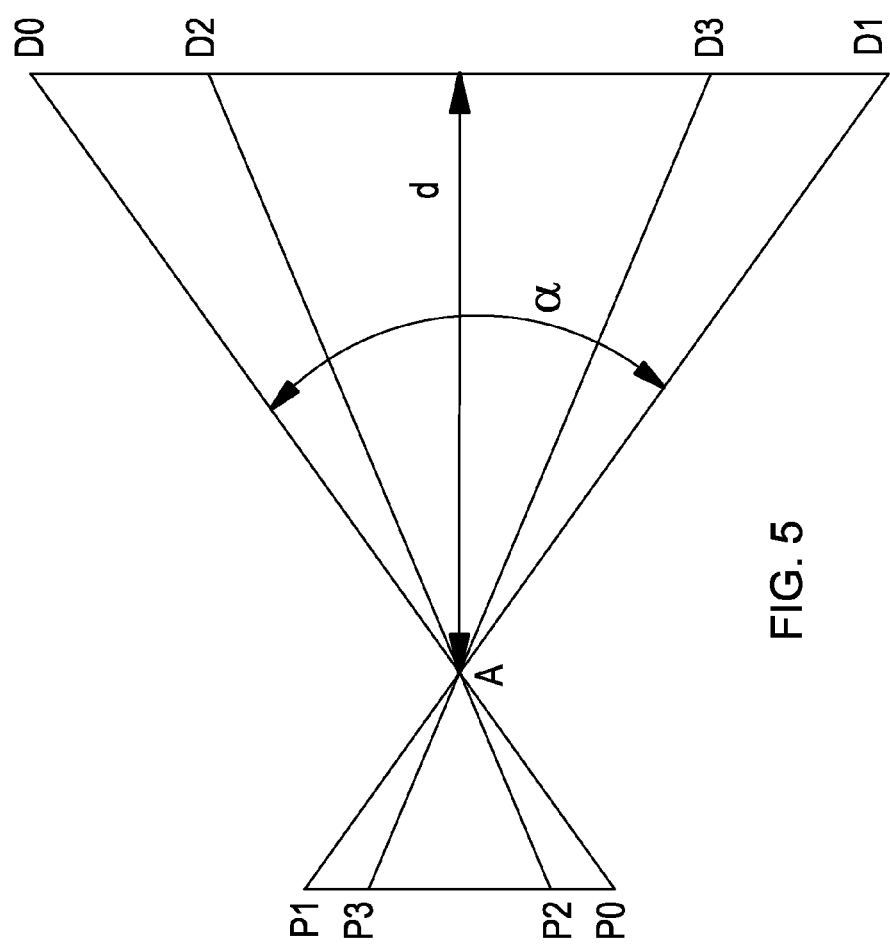
FIG. 5 schematically illustrates a method of calculating a scale factor of an image of a physical object acquired by the EIR terminal disclosed herein.

In one illustrative embodiment, schematically shown in FIG. 5, the scale factor of the acquired image can be calculated as follows:

$$S = G/|P_0 - P_1|,$$

wherein S is the image scale factor measured in the units of length per image pixel;

$|P_0 - P_1|$ is the separation of corresponding edges in image in the given direction measured in pixels; and G is the field of view of the imaging lens which can be determined as follows:

$$G = 2 * d * \tan(\alpha/2),$$

wherein $\alpha$ is the maximum angle of view of the imaging lens; and d is the distance to the object determined using motion sensing data as described herein supra.

In a further aspect, a physical dimension of the imaged object can be calculated as follows:

$$D = |D_2 - D_3| = S * |P_2 - P_3|,$$

wherein $|D_2 - D_3|$ is the distance between two points $D_2$ and $D_3$ situated on the surface of the imaged object measured in the units of length; and $|P_2 - P_3|$ is the distance between corresponding images $P_2$ and $P_3$ measured in pixels of points $D_2$ and $D_3$, respectively.

In one embodiment, the acquired image, the object identifier, the object description, and/or the calculated image scale factor can be transmitted by EIR terminal 100 to an external computer via a wired or wireless communication interface. In one embodiment, the acquired image, the object identifier, the object description, and/or the calculated image scale can be stored in a database together with a description of the physical structure.

Figure 6:
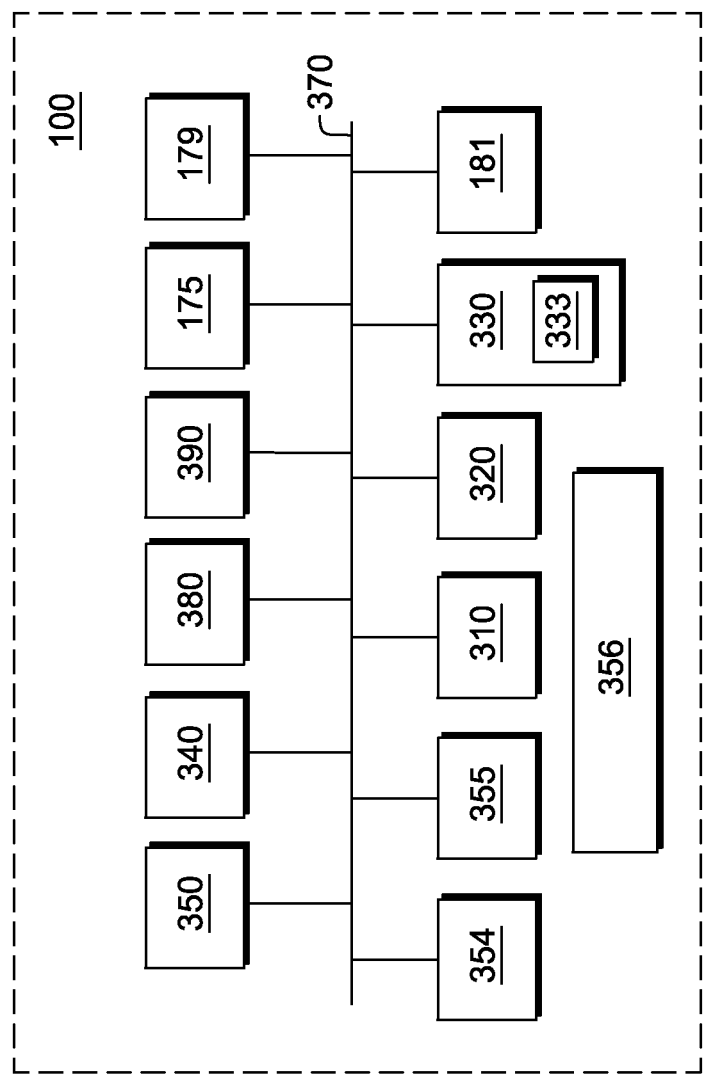
FIG. 6 schematically illustrates a component-level diagram of one embodiment of the EIR terminal disclosed herein.

Component-level diagram of one embodiment of the EIR terminal disclosed herein is now being described with references to FIG. 6. EIR terminal 100 can comprise at least one microprocessor 310 and a memory 320, both coupled to the system bus 370. Microprocessor 310 can be provided by a general purpose microprocessor or by a specialized microprocessor (e.g., an ASIC). In one embodiment, EIR terminal 100 can comprise a single microprocessor which can be referred to as a central processing unit (CPU). In another embodiment, EIR terminal 100 can comprise two or more microprocessors, for example, a CPU providing some or most of the EIR terminal functionality and a specialized microprocessor performing some specific functionality. A skilled artisan would appreciate the fact that other schemes of processing tasks distribution among two or more microprocessors are within the scope of this disclosure.

EIR terminal 100 can further comprise a communication interface 340 communicatively coupled to the system bus 370. In one embodiment, the communication interface can be provided by a wireless communication interface. The wireless communication interface can be configured to support, for example, but not limited to, the following protocols: at least one protocol of the IEEE 802.11/802.15/802.16 protocol family, at least one protocol of the HSPA/GSM/GPRS/EDGE protocol family, TDMA protocol, UMTS protocol, LTE protocol, and/or at least one protocol of the CDMA/1xEV-DO protocol family. In another embodiment, the communication interface 340 can be provided by a wired interface. In a yet another embodiment, the communication interface 340 can be provided by an optical interface. A skilled artisan would appreciate the fact that other types of communication interfaces are within the scope of this disclosure.

EIR terminal 100 can further comprise a battery 356. In one embodiment, the battery 356 can be provided by a replaceable rechargeable battery pack. EIR terminal 100 can further comprise a GPS receiver 380. EIR terminal 100 can further comprise at least one connector 390 configured to receive a subscriber identity module (SIM) card.

EIR terminal 100 can further comprise one or more EIR devices 330. EIR device can be provided, for example, by a bar code reading device, a magnetic card reading device, a smart card reading device, or an RFID reading device. A skilled artisan would appreciate the fact that other types of EIR devices are within the scope of this disclosure. In one embodiment, EIR device 330 can be configured to output raw message data containing an encoded message. Alternatively, EIR device 330 can be configured to output decoded message data corresponding to an encoded message. For example, a bar code reading device can be configured to output an image containing a bar code and/or to output a byte sequence containing a decoded message corresponding to a scanned bar code. In another example, an RFID reading device can be configured to read and output a byte sequence from a memory of an RFID tag.

As used herein, "message" is intended to denote a bit sequence or a character string comprising alphanumeric and/or non-alphanumeric characters. An encoded message can be used to convey information, such as identification of the source and the model of an item, for example, in an EPC code.

As noted herein supra, EIR device 330 can comprise an imaging device 333 comprising a two-dimensional image sensor and at least one imaging lens which can be employed to focus an image of the target object onto the image sensor.

In one embodiment, EIR terminal 100 can further comprise a graphical user interface including a display adapter 175 and a keyboard 179. In one embodiment, the EIR terminal 100 can further comprise an audio output device, e.g., a speaker 181.

It is not necessary that a device's primary function involve reading encoded messages in order to be considered an EIR terminal; for example, a cellular telephone, a smart phone, a PDA, or other portable computing device that is capable of acquiring two-dimensional images can be referred to as an EIR terminal for purposes of this disclosure.

Figure 7:
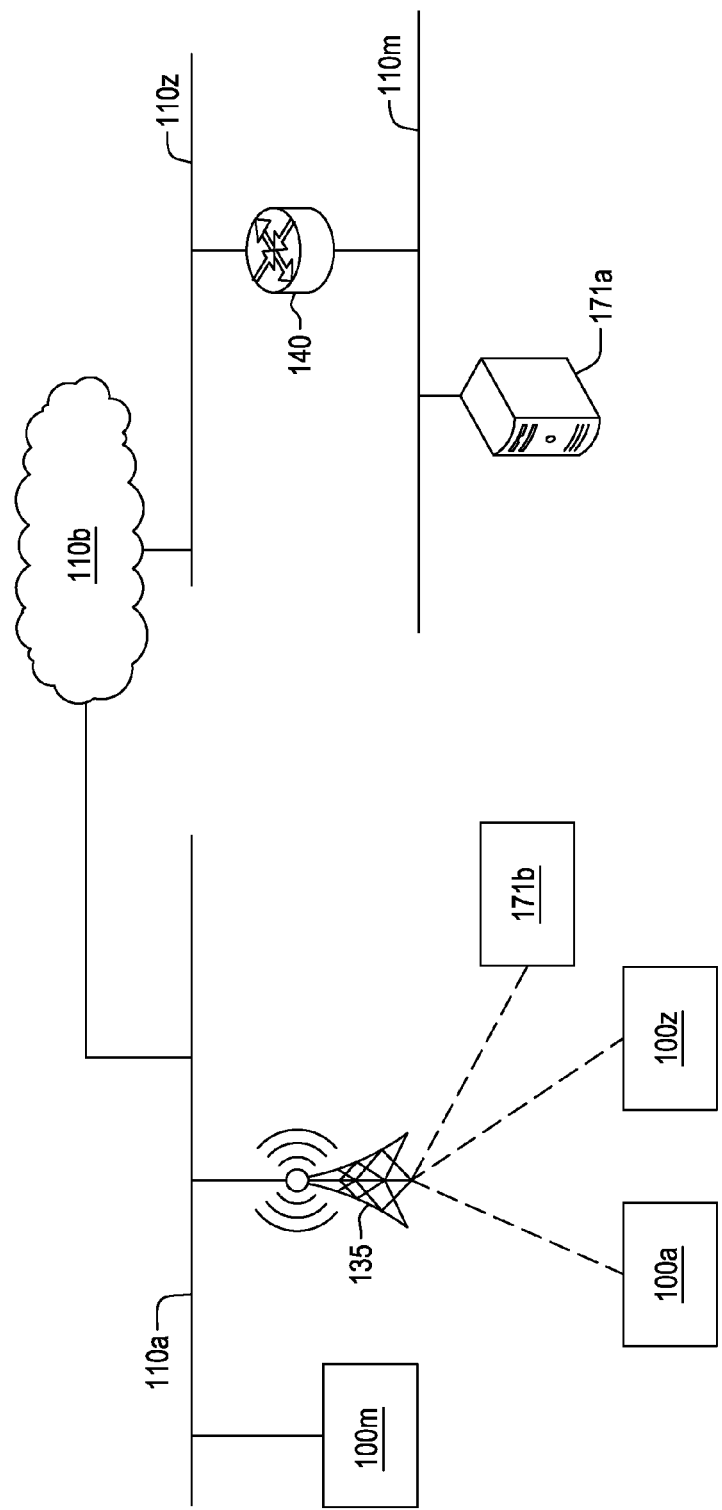
FIG. 7 schematically illustrates a network diagram of one embodiment of a data collection system employing EIR terminals.

In a further aspect, EIR terminal 100 can be incorporated in a data collection system. One embodiment of the data collection system, schematically shown in FIG. 7, can include a plurality of EIR terminals 100a-100z in communication with a plurality of interconnected networks 110a-110z.

An EIR terminal 100a-100z can establish a communication session with an external computer 171 (provided, for example, by a database server 171a or a portable RFID reading terminal 171b). In one embodiment, network frames can be exchanged by the EIR terminal 100 and the external computer 171 via one or more routers 140, access points 135, and other infrastructure elements. In another embodiment, the external computer 171 can be reachable by the EIR terminal 100 via a local area network (LAN). In a yet another embodiment, the external computer 171 can be reachable by the EIR terminal 100 via a wide area network (WAN). In a yet another embodiment, the external computer 171 can be reachable by the EIR terminal 100 directly (e.g., via a wired or wireless interface). A skilled artisan would appreciate the fact that other methods of providing interconnectivity between the EIR terminal 100 and the external computer 171 relying upon LANs, WANs, virtual private networks (VPNs), and/or other types of network are within the scope of this disclosure.

A "computer" herein shall refer to a programmable device for data processing and control, including a central processing unit (CPU), a memory, and at least one communication interface. For example, in one embodiment, a computer can be provided by a server running a single instance of a multi-tasking operating system. In another embodiment, a computer can be provided by a virtual server, i.e., an isolated instance of a guest operating system running within a host operating system. A "network" herein shall refer to a set of hardware and software components implementing a plurality of communication channels between two or more computers. A network can be provided, e.g., by a local area network (LAN), or a wide area network (WAN). While different networks can be designated herein, it is recognized that a single network as seen from the application layer interface to the network layer of the OSI model can comprise a plurality of lower layer networks, i.e., what can be regarded as a single Internet Protocol (IP) network, can include a plurality of different physical networks.

The communications between the EIR terminal 100 and the external computer 171 can comprise a series of requests and responses transmitted over one or more TCP connections. A skilled artisan would appreciate the fact that using various transport and application level protocols is within the scope of this disclosure.

As noted herein supra, at least one of the messages transmitted by EIR terminal 100 to external computer 171 can include an image of a physical object (e.g., a physical structure sustaining one or more retail items), the object identifier, and the image scale factor calculated by the EIR terminal. In one embodiment, at least one of the messages transmitted by the EIR terminal 100 to external computer 171 can further comprise physical dimensions of the object which can be calculated by EIR terminal 100 as described herein supra and/or inputted by the EIR terminal 100, e.g., by decoding a bar code or querying an RFID tag attached to the imaged object. In another embodiment, at least one of the messages transmitted by the EIR terminal 100 to external computer 171 can further comprise the object description, such as the position of the object on the facility floor plan and/or characteristics of the object comprising, for example, the number, sizes, and locations of shelves.

As noted herein supra, in one embodiment the external computer 171 can be provided by a database server 171a configured to store images and descriptions of physical objects (e.g., physical structured employed to sustain inventory items in manufacturing, retail, or storage facilities). In another embodiment, the external computer 171 can be provided by a portable RFID reading terminal 171b employed to read RFID tags attached to items stored in a manufacturing, retail, and/or storage facility. A skilled artisan would appreciate the fact that other types and uses of external computers 171 are within the scope of this disclosure.

Figure 8:
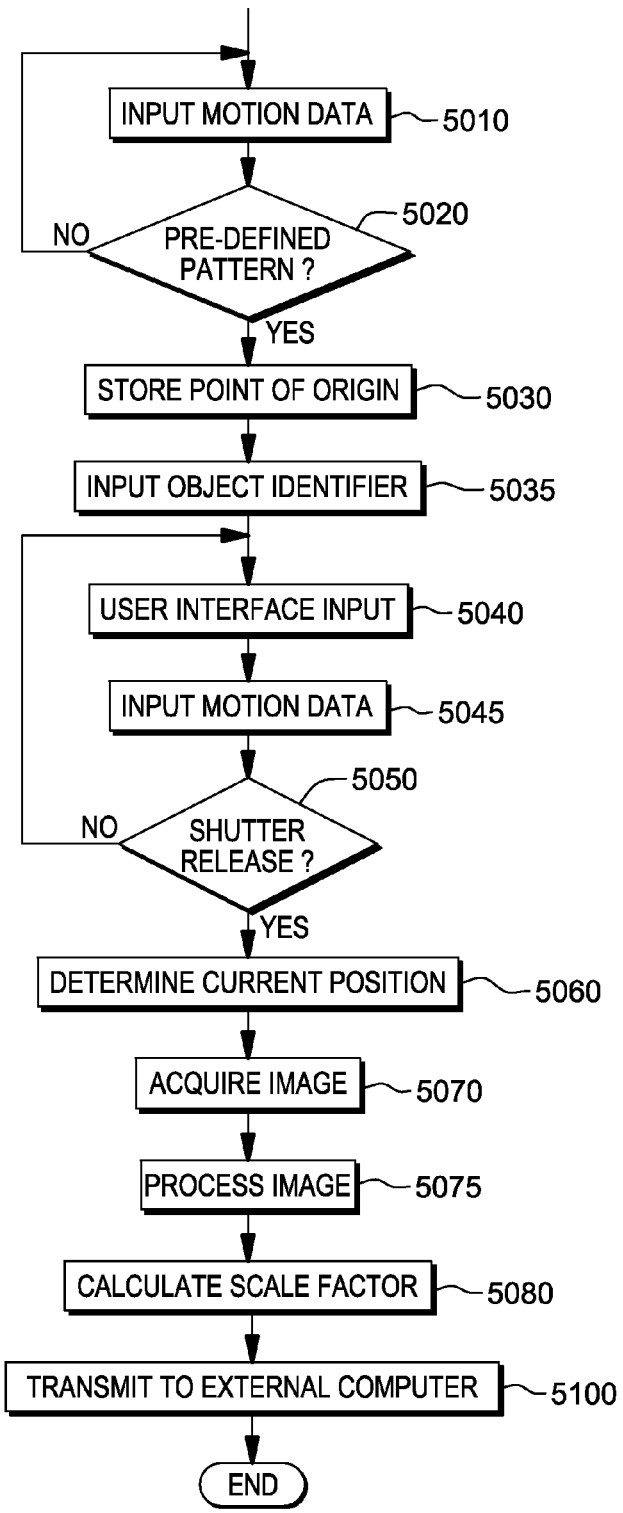
FIG. 8 is a flowchart of one embodiment of a method of acquiring an image of a physical object by an EIR terminal disclosed herein.

One embodiment of a method of acquiring an image of a physical object by an EIR terminal disclosed herein is now being described with references to FIG. 8.

At steps 5010-5020, EIR terminal 100 can perform a data input loop acquiring data from its motion sensing device, and responsive to detecting, at step 5020, a pre-defined pattern in the acquired data, the processing can continue at step 5030; otherwise, the method can loop back to step 5010. As noted herein supra, the pre-defined data pattern can be chosen to correspond to the mechanical velocities and proper accelerations of the EIR terminal along three mutually perpendicular axes immediately becoming zeroes, which can be caused by the operator of the EIR terminal bringing the EIR terminal in a mechanical contact with a stationary physical object.

At step 5030, EIR terminal 100 can store in the memory its current spatial position and orientation as a point of origin. As explained herein supra, the operator of the EIR terminal can be instructed, before activating the shutter release control, to bring the EIR terminal 100 into a mechanical contact with a pre-defined area 199 of a physical object 190 to be imaged, which would result in the EIR terminal setting the point of origin to coincide with a pre-defined point on the surface of the object 190.

At step 5035, EIR terminal 100 can input the identifier of the imaged physical object. In one embodiment, the physical object can be identified by scanning a bar code label attached to the object and decoding the bar code to retrieve the object identifier. In another embodiment, the imaged object can be identified by reading an RFID label attached to the object, as described in details herein supra. In a further aspect, the message encoded in the bar code or in the RFID tag can further include the object description, such as the position of the object on the facility floor plan and/or the description of the object comprising, for example, object dimensions, the number, sizes, and locations of shelves. In an alternative embodiment, the step of inputting the imaged object identifier can precede the step 5010 of acquiring motion sensing data, i.e., the operator of EIR terminal 100 can scan a bar code label attached to the surface of the imaged object (or, in another embodiment, EIR terminal 100 can read an RFID tag attached to the surface of the imaged object) either before or after "tapping" a designated point on the surface of the imaged object.

At steps 5040-5050, EIR terminal 100 can perform a user interface input loop, and responsive to establishing at step 5050 that Shutter release button has been activated by the operator of EIR terminal 100, the processing can continue at step 5060; otherwise, the method can loop back to step 5040. A skilled artisan would appreciate the fact that other ways of initiating an image acquiring operation are within the scope of this disclosure.

The user interface loop can comprise a step 5045 of acquiring motion data from a motion sensing device. As noted herein supra, in one embodiment, the motion sensing device can be provided by at least three accelerometers configured to measure proper acceleration values of the EIR terminal along at least three mutually-perpendicular axes. In another embodiment, the motion sensing device can be provided by a 9-DOF (degree of freedom) motion sensing unit containing a 3-axis accelerometer, a 3-axis magnetometer, and 3-axis gyroscope sensors.

At step 5060, EIR terminal 100 can determine the current position of the EIR terminal relative to the previously identified point of origin, based on the data received from the motion sensing device at step 5045 since the moment of detecting a mechanical contact with a stationary object.

At step 5070, EIR terminal 100 can acquire an image of the object focused onto by the imaging lens.

At step 5075, EIR terminal 100 can process the image. In one embodiment, image processing comprises removing keystone- and rotation-related distortions as described in details herein supra. In another embodiment, image processing further comprise detecting edges within the image as described in details herein supra.

At step 5080, EIR terminal 100 can calculate the scale factor of the acquired image and the dimensions of the imaged object, as described in details herein supra.

At step 5100, EIR terminal 100 can transmit to an external computer the object identifier, the acquired image of the object, the object description, and/or the calculated image scale factor, and the method can terminate.

Figure 9B:
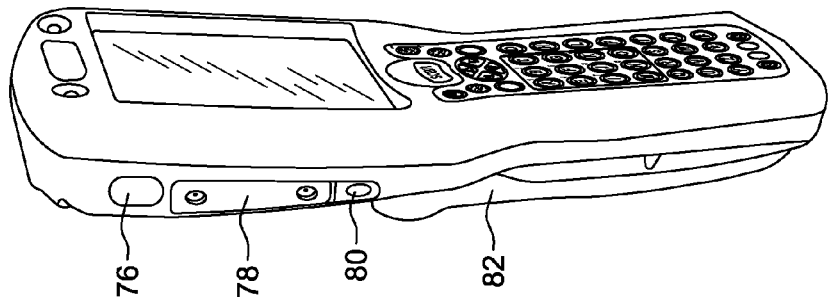
FIGS. 9a-9c schematically illustrate embodiments of the EIR terminal disclosed herein.
Figure 9C:
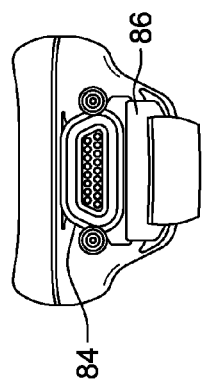
Figure 9A:
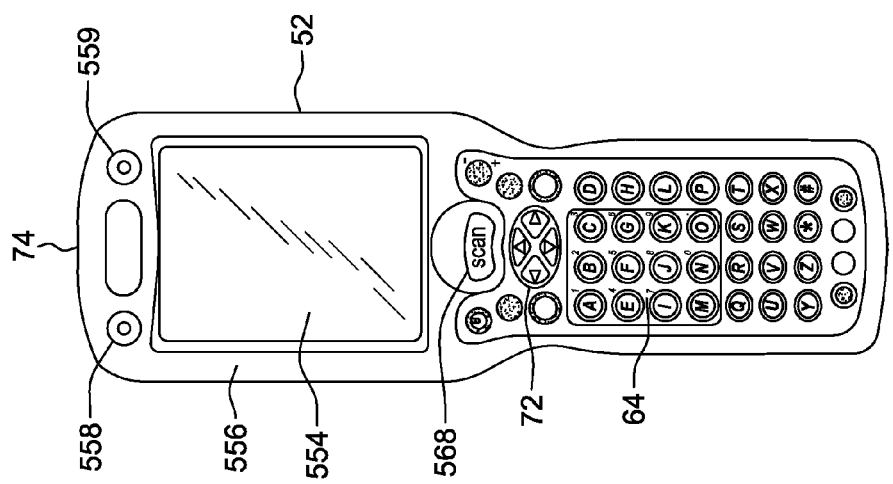

One embodiment of the EIR terminal 100 is schematically shown in FIGS. 9a (front panel view), 9b (side panel view), and 9c (bottom panel view). The EIR terminal 100 can comprise a housing 52 within which other components of the EIR terminal 100 can be disposed. An LCD screen display with a touch screen sensor 554 can be disposed on the front panel 556. Also disposed on the front panel 556 can be a decode LED 558, a scan LED 559, and a keyboard 64 including a scan key 568 and navigation keys 72. An imaging window 74 can be disposed on the top panel of housing 52. Disposed on the side panel (best viewed in FIG. 9b) can be an infra-red communication port 76, an access door to a secure digital (SD) memory interface 78, an audio jack 80, and a hand strap 82. Disposed on the bottom panel (best viewed in FIG. 9c) can be a multi-pin mechanical connector 84 and a hand strap clip 86. An EIR device provided, for example, by an RFID reading device (not shown in FIGS. 9a-9c) can be disposed within the housing 52.

While the present invention has been particularly shown and described with reference to certain exemplary embodiments, it will be understood by one skilled in the art that various changes in detail may be affected therein without departing from the spirit and scope of the invention as defined by claims that can be supported by the written description and drawings. Further, where exemplary embodiments are described with reference to a certain number of elements it will be understood that the exemplary embodiments can be practiced utilizing less than the certain number of elements.

An encoded information reading (EIR) terminal can comprise a microprocessor, a memory, an EIR device including a two-dimensional imaging device, a motion sensing device, and a communication interface. The EIR device can be configured to output raw image data containing an encoded message and/or to output decoded message data corresponding to an encoded message. The EIR terminal can be configured, responsive to detecting a pre-defined pattern in a first plurality of values received from the motion sensing device, to store in the memory a point of origin equal to a first spatial position of the EIR terminal. The EIR terminal can be further configured, responsive to detecting a user interface command, to determine, based on a second plurality of values received from the motion sensing device, a second spatial position of the EIR terminal relative to the point of origin, and to acquire an image of the object. The EIR terminal can be further configured to determine the image scale factor based on at least the second spatial position.

A small sample of systems, methods, and apparata that are described herein is as follows:

A1. An encoded information reading (EIR) terminal comprising:
 a microprocessor;
 a memory;
 an EIR device including a two-dimensional imaging device, said EIR device configured to perform at least one of: outputting raw image data containing an encoded message, outputting decoded message data corresponding to an encoded message;
 a motion sensing device;
 a communication interface;
 wherein said EIR terminal is configured, responsive to detecting a pre-defined pattern in a first plurality of values received from said motion sensing device, to store in said memory a point of origin equal to a first spatial position of said EIR terminal;
 wherein said EIR terminal is further configured, responsive to detecting a user interface command, to determine, based on a second plurality of values received from said motion sensing device, a second spatial position of said EIR terminal relative to said point of origin, and to acquire an image of an object in a field of view of said imaging device; and
 wherein said EIR terminal is further configured to determine a scale factor of said image based on at least said second spatial position.

A2. The EIR terminal of (A1), wherein said image scale factor is provided by a ratio of a size of said object along a chosen direction to a size of an image of said object in said chosen direction.

A3. The EIR terminal of (A1), wherein said motion sensing device is provided by at least three accelerometers configured to measure proper acceleration values of said EIR terminal along at least three mutually-perpendicular axes.

A4. The EIR terminal of (A1), wherein said motion sensing device is provided by a 9-DOF (degree of freedom) motion sensing unit containing a 3-axis accelerometer, a 3-axis magnetometer, and 3-axis gyroscope sensors.

A5. The EIR terminal of (A1), wherein said motion sensing device is provided by at least three accelerometers configured to measure proper acceleration values of said EIR terminal along at least three mutually-perpendicular axes; and
 wherein said EIR terminal is further configured to determine a change of a spatial position and orientation of said EIR terminal based on proper acceleration values received from said at least three accelerometers.

A6. The EIR terminal of (A1), further configured, before determining said scale factor, to process said image to remove one or more distortions selected from the group consisting of: keystone-related distortions, and rotation-related distortions.

A7. The EIR terminal of (A1), further configured to process said image to detect a plurality of edges of an object and to determine one or more dimensions of said object.

A8. The EIR terminal of (A1), further configured to transmit said image to an external computer via said communication interface.

A9. The EIR terminal of (A1), further configured to transmit to an external computer said image and at least one of: an identifier of said object, a description of said object, one or more dimensions of said object.9. The EIR terminal of (A1), further configured to identify said object.

A10. The EIR terminal of (A1), further configured to identify said object by performing one of: scanning a bar code attached to said object, reading an RFID tag attached to said object.

A11. The EIR terminal of (A1), further comprising an RFID reading device;
 wherein said EIR terminal is further configured to identify said object by reading an RFID tag attached to said object.

A12. The EIR terminal of (A1), further comprising a second EIR device selected from the group consisting of: a bar code reading device, an RFID reading device, a magnetic card reading device;
 wherein said second EIR device is configured to perform at least one of: outputting raw message data containing an encoded message, outputting decoded message data corresponding to an encoded message.

B1. A method of producing an image of an object by an EIR terminal comprising a microprocessor, a memory, a two-dimensional imaging device, and a motion sensing device, said method comprising the steps of:
responsive to detecting a pre-defined pattern in a first plurality of values received from said motion sensing device, said EIR terminal storing in said memory a first spatial position of said EIR terminal as a point of origin;
responsive to detecting a user interface command, said EIR terminal determining, based on a second plurality of values received from said motion sensing device, a second position of said EIR terminal relative to said point of origin;
said EIR terminal acquiring an image of said object; and
said EIR terminal determining a scale factor of said image based on at least said second spatial position.

B2. The method of (B1), wherein said image scale factor is provided by a ratio of a size of said object along a chosen direction to a size of an image of said object in said chosen direction.

B3. The method of (B1), wherein said motion sensing device is provided by at least three accelerometers configured to measure proper acceleration values of said EIR terminal along at least three mutually-perpendicular axes.

B4. The method of (B1), wherein said motion sensing device is provided by a 9-DOF (degree of freedom) motion sensing unit containing a 3-axis accelerometer, a 3-axis magnetometer, and 3-axis gyroscope sensors.

B5. The method of (B1), further comprising the step of said EIR terminal processing said image to remove one or more distortions selected from the group consisting of: keystone-related distortions and rotation-related distortions.

B6. The method of (B1), further comprising the steps of:
said EIR terminal processing said image to detect a plurality of edges of an object; and
said EIR terminal determining one or more dimensions of said object.

B7. The method of (B1), further comprising the step of said EIR terminal transmitting said image to an external computer.

B8. The method of (B1), further comprising the step of said EIR terminal transmitting to an external computer said image and at least one of: an identifier of said object, a description of said object, one or more dimensions of said object.

B9. The method of (B1), further comprising the step of said EIR terminal identifying said object.

B10. The method of (B1), further comprising the step of said EIR terminal identifying said object;
wherein said step of identifying said object is performed by one of: scanning a bar code attached to said object; reading an RFID tag attached to said object.

The invention claimed is:

1. An apparatus comprising:
a motion sensing device;
a communication interface; and
a processor that:
stores, responsive to detecting a pre-defined pattern in a first plurality of values received from said motion sensing device, in memory a point of origin that corresponds to a first spatial position of said apparatus,
determines, responsive to detecting a user interface command and based on a second plurality of values received from said motion sensing device, a second spatial position of said apparatus relative to said point of origin, and to acquire an image of an object in a field of view of said apparatus; and
determines a scale factor of said image based on at least said second spatial position, wherein said image scale factor is provided by a ratio of a size of said object along a chosen direction to a size of an image of said object in said chosen direction.

2. The apparatus of claim 1, wherein said motion sensing device is provided by at least three accelerometers configured to measure proper acceleration values of said apparatus along at least three mutually-perpendicular axes.

3. The apparatus of claim 1, wherein said motion sensing device is provided by a 9-DOF (degree of freedom) motion sensing unit containing a 3-axis accelerometer, a 3-axis magnetometer, and 3-axis gyroscope sensors.

4. The apparatus of claim 1, further configured, before determining said scale factor, to process said image to remove one or more distortions selected from the group consisting of: keystone-related distortions, and rotation-related distortions.

5. The apparatus of claim 1, further configured to process said image to detect a plurality of edges of an object and to determine one or more dimensions of said object.

6. The apparatus of claim 1, further configured to transmit said image to an external computer via said communication interface.

7. The apparatus of claim 1, further configured to transmit to an external computer said image and at least one of: an identifier of said object, a description of said object, one or more dimensions of said object.

8. The apparatus of claim 1, further configured to identify said object by performing one of: scanning a bar code attached to said object, reading an RFID tag attached to said object.

9. The apparatus of claim 1, further comprising an RFID reading device;
wherein said apparatus is further configured to identify said object by reading an RFID tag attached to said object.

10. The apparatus of claim 1, wherein the processor is associated with a encoded information reading device selected from the group consisting of: a bar code reading device, an RFID reading device, a magnetic card reading device;
wherein said encoded information reading device is configured to perform at least one of: outputting raw message data containing an encoded message, outputting decoded message data corresponding to an encoded message.

11. A method of producing an image of an object by an apparatus comprising a motion sensing device, said method comprising:
responsive to detecting a pre-defined pattern in a first plurality of values received from said motion sensing device, said apparatus storing in memory a first spatial position of said apparatus as a point of origin;
responsive to detecting a user interface command, determining, based on a second plurality of values received from said motion sensing device, a second position of said apparatus relative to said point of origin;
acquiring an image of said object; and
determining a scale factor of said image based on at least said second spatial position,
wherein said image scale factor is provided by a ration of a size of said object along a chosen direction to a size of an image of said object in said chosen direction.

12. The method of claim 11, wherein said motion sensing device is provided by at least three accelerometers configured to measure proper acceleration values of said apparatus along at least three mutually-perpendicular axes.

13. The method of claim 11, wherein said motion sensing device is provided by a 9-DOF (degree of freedom) motion sensing unit containing a 3-axis accelerometer, a 3-axis magnetometer, and 3-axis gyroscope sensors.

14. The method of claim 11, further comprising:
 processing said image to detect a plurality of edges of an object; and
 determining one or more dimensions of said object.

15. The method of claim 11, further comprising transmitting said image to an external computer.

16. The method of claim 11, further comprising transmitting to an external computer said image and at least one of: an identifier of said object, a description of said object, one or more dimensions of said object.

17. The method of claim 11, further comprising identifying said object.

18. The method of claim 11, further comprising identifying said object;
 wherein said identifying said object is performed by one of: scanning a bar code attached to said object; reading an RFID tag attached to said object.

19. An apparatus comprising:
a motion sensing device provided by a 9-DOF (degree of freedom) motion sensing unit containing a 3-axis accelerometer, a 3-axis magnetometer, and 3-axis gyroscope sensors;
a communication interface; and
a processor that:
 stores, responsive to detecting a pre-defined pattern in a first plurality of values received from said motion sensing device, in memory a point of origin that corresponds to a first spatial position of said apparatus,
 determines, responsive to detecting a user interface command and based on a second plurality of values received from said motion sensing device, a second spatial position of said apparatus relative to said point of origin, and to acquire an image of an object in a field of view of said apparatus; and
 determines a scale factor of said image based on at least said second spatial position.

\* \* \* \* \*